United States Patent
Kinjo et al.

(10) Patent No.: US 11,489,474 B2
(45) Date of Patent: Nov. 1, 2022

(54) DRIVING DEVICE FOR ROTATING ELECTRIC MACHINE

(71) Applicant: DENSO CORPORATION, Kariya (JP)

(72) Inventors: Hirofumi Kinjo, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/306,197

(22) Filed: May 3, 2021

(65) Prior Publication Data

US 2021/0257947 A1    Aug. 19, 2021

Related U.S. Application Data

(63) Continuation of application No. PCT/JP2019/034587, filed on Sep. 3, 2019.

(30) Foreign Application Priority Data

Nov. 1, 2018 (JP) .............................. JP2018-206265

(51) Int. Cl.
| | |
|---|---|
| *H02P 21/00* | (2016.01) |
| *H02P 21/22* | (2016.01) |
| *H02P 6/10* | (2006.01) |
| *H02P 25/22* | (2006.01) |

(52) U.S. Cl.
CPC ................. *H02P 21/22* (2016.02); *H02P 6/10* (2013.01); *H02P 25/22* (2013.01)

(58) Field of Classification Search
CPC ............. H02P 21/22; H02P 25/22; H02P 6/10
USPC ...................................................... 318/400.02
See application file for complete search history.

(56) References Cited

U.S. PATENT DOCUMENTS

| | | | |
|---|---|---|---|
| 2002/0027789 A1* | 3/2002 | Okushima | H02M 7/48 363/41 |
| 2008/0303470 A1* | 12/2008 | Schulz | H02P 5/74 318/636 |
| 2017/0117830 A1 | 4/2017 | Kanekawa et al. | |
| 2022/0173671 A1* | 6/2022 | Yamashita | H02K 9/227 |

FOREIGN PATENT DOCUMENTS

| | | |
|---|---|---|
| JP | 2006-129666 A | 5/2006 |
| JP | 2016-092946 A | 5/2016 |
| JP | 2017-022927 A | 1/2017 |
| JP | 2017-175747 A | 9/2017 |

* cited by examiner

*Primary Examiner* — Erick D Glass
(74) *Attorney, Agent, or Firm* — Oliff PLC

(57) ABSTRACT

In a driving device for a rotating electric machine, a first inverter unit blocks and allows, for each winding of multiphase windings of the rotating electric machine, current conduction on one side of the winding and a second inverter unit blocks and allows current conduction on the other side of the winding. A plurality of second switching elements forming the second inverter unit each have a lower ON resistance than a plurality of first switching elements forming the first inverter unit. A controller is configured to switch on and off the respective first switching elements at a switching frequency higher than an electric fundamental frequency and switch on and off the respective second switching elements at a switching frequency lower than the switching frequency at which to switch on and off the first switching elements.

20 Claims, 15 Drawing Sheets

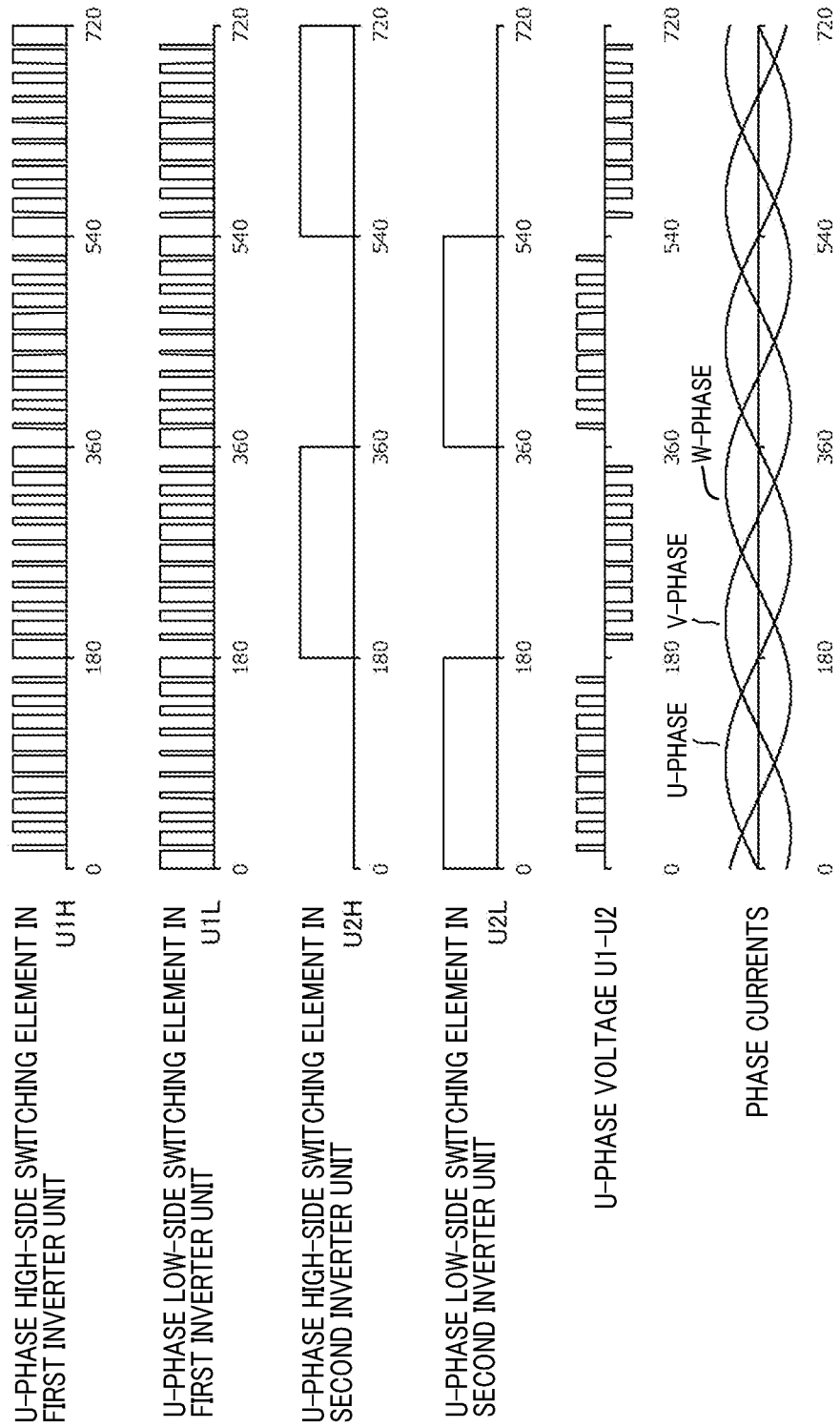

DRIVING DEVICE FOR ROTATING ELECTRIC MACHINE

CROSS-REFERENCE TO RELATED APPLICATION

This application is based on Japanese application No. 2018-206265 filed on Nov. 1, 2018, the contents of which are incorporated herein by reference.

BACKGROUND

Technical Field

This disclosure relates to a driving device for a rotating electric machine.

Related Art

A known technique provides a configuration in which two inverters each formed of a plurality of switching elements are connected to a motor generator including open windings and the two inverters are connected via connection lines. In this configuration, the two inverters, in only one of which the switching elements are rapidly turned on and off complementarily under the pulse width modulation (PWM) control, are alternately switched every half cycle of the electric fundamental frequency of the motor generator. AC voltages are thereby applied to the windings of the motor generator.

BRIEF DESCRIPTION OF THE DRAWINGS

In the accompanying drawings:

FIG. 4 is a timing chart illustrating drive waveforms for inverter units, applied voltage waveforms and phase current waveforms supplied to coils of a motor generator according to a first embodiment;

DESCRIPTION OF SPECIFIC EMBODIMENTS

Figure 16:
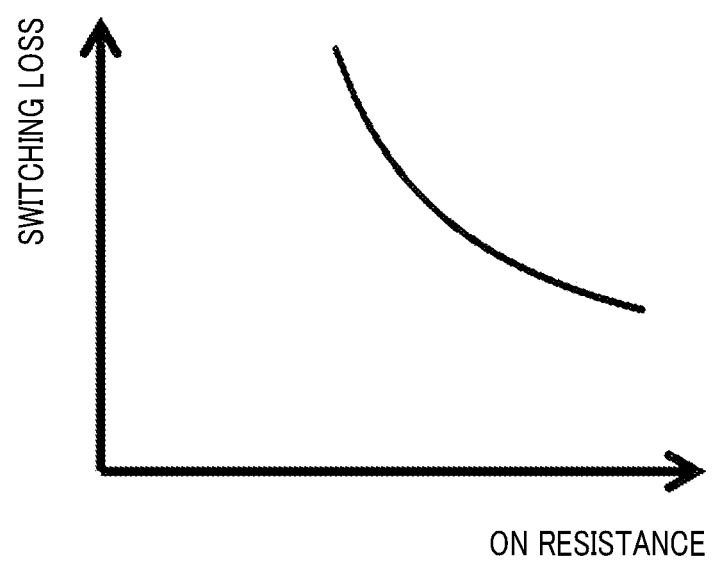
FIG. 16 is an illustration of a relationship between ON resistance and switching loss of a transistor.

Since the above known technique, as described in JP-A-2017-175747, performs high frequency switching alternatingly between the two inverters, it is necessary to use switching elements with a small gate input capacitance and a small switching loss (at a high switching speed) in both of the two inverters. However, as illustrated in FIG. 16, the switching loss and the ON resistance (or the conduction loss) in each switching element are in a trade-off relationship. Switching elements with a smaller switching loss have a larger ON resistance and a larger conduction loss. Thus, in the technique described in JP-A-2017-175747, both of the two inverters have a large conduction loss.

In view of the foregoing, it is desired to have a driving device for a rotating electric machine, which can reduce conduction losses while suppressing the increase in switching loss of inverters.

One aspect of the present disclosure provides a driving device for a rotating electric machine, including: a first inverter unit formed of a plurality of first switching elements, the plurality of first switching elements being operable to separately block and allow, for each phase of the rotating electric machine including multi-phase windings, current conduction between a first point of high potential and one end of a corresponding one of the windings to the phase and current conduction between the one end of the corresponding one of the windings to the phase and a first point of low potential; a second inverter unit formed of a plurality of second switching elements, each of the plurality of second switching elements having a lower ON resistance than the respective first switching elements, the plurality of second switching elements being operable to separately block and allow, for each phase of the rotating electric machine, current conduction between a second point of high potential and an other end of the corresponding one of the windings to the phase and current conduction between the other end of the corresponding one of the windings to the phase and a second point of low potential. In the driving device, a controller is configured to switch on and off the respective first switching elements in the first inverter unit at a switching frequency higher than an electric fundamental frequency of the rotating electric machine and switch on and off the respective second switching elements in the second inverter unit at a switching frequency lower than the switching frequency at which to switch on and off the respective first switching elements in the first inverter unit.

The driving device for the rotating electric machine according to the above aspect of this disclosure can reduce conduction losses while suppressing the increase of the switching loss of the inverter.

Hereinafter, exemplary embodiments of the present disclosure will be described in detail with reference to the accompanying drawings.

First Embodiment

Figure 1:
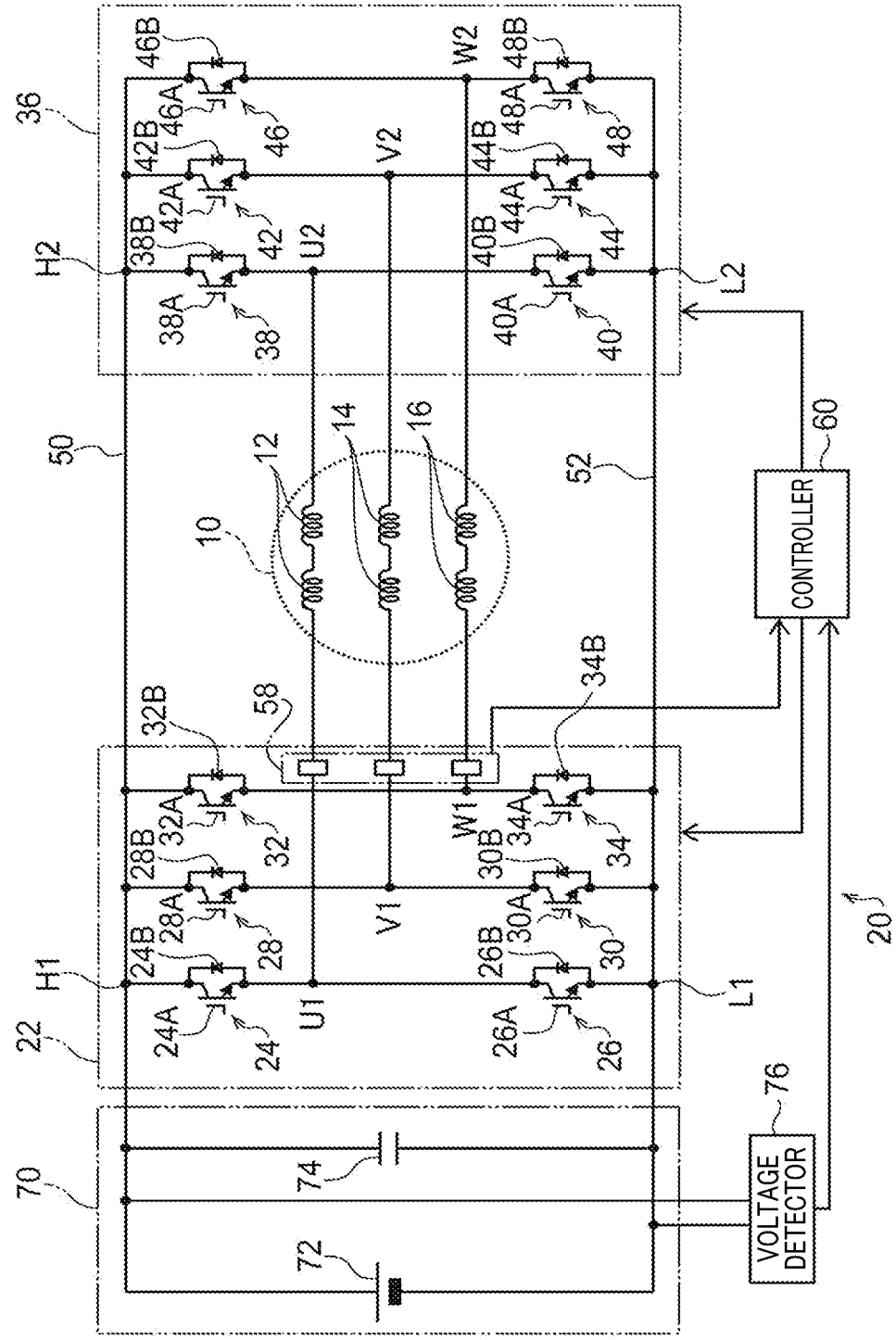
FIG. 1 is a schematic diagram of a driving device for a rotating electric machine according to a first embodiment.

FIG. 1 illustrates a motor generator 10 as an example of a rotating electric machine, a driving device 20 that drives the motor generator 10, and a first DC power source unit 70 that supplies direct-current (DC) power to the driving device 20. The driving device 20 is an example of the driving device for the rotating electric machine.

The motor generator 10 is a so-called "prime mover" to be mounted to a motorized vehicle, such as an electric vehicle, a hybrid vehicle or the like, which generates torques for driving the drive wheel (not shown) of the motorized vehicle. The motor generator 10 may act as an electric motor which is driven by the driving device 20 or as a power generator which is driven by driving forces transmitted from the drive wheel or an engine (not shown) of the motorized vehicle to generate electric power. In the present embodiment, cases where the motor generator 10 acts as an electric motor will mainly be described.

The motor generator 10 is a three-phase rotating machine with open windings, which has a U-phase coil 12, a V-phase coil 14, and a W-phase coil 16. The U-phase coil 12, the V-phase coil. 14, and the W-phase coil 16 are hereinafter respectively referred to "coils 12-16" as appropriate. The current flowing through the U-phase coil 12 is referred to U-phase current iu, the current flowing through the V-phase coil 14 is referred to V-phase current iv, and the current flowing through the W-phase coil 16 is referred to W-phase current iw. Regarding the current following through the coils 12-16, the current flowing from the first inverter unit 22 side to the second inverter unit 36 side is in a positive direction, and the current flowing from the second inverter unit 36 side to the first inverter unit 22 side in a negative direction.

The phase currents iu, iv, and iw of the motor generator 10 are detected by a current detector 58 equipped with a current detection element, such as a Hall element or the like, for each phase. The rotating electrical angle θ of the output shaft of the motor generator 10 is detected by a rotating electrical angle sensor (not shown).

The driving device 20 includes a first inverter unit 22, a second inverter unit 36, a high-side connection line 50, a low-side connection line 52, and a controller 60.

The first inverter unit 22 is a three-phase inverter that switches energization of the coils 12 to 16. The first inverter unit 22 includes, for the coil 12, a switching element 24 provided between a first point of high potential H1 and a connection point U1 in the first inverter unit 22 and a switching element 26 provided between a first point of low potential L1 and the connection point U1 in the first inverter unit 22. The first inverter unit 22 includes, for the coil 14, a switching element 28 provided between a first point of high potential H1 and a connection point V1 in the first inverter unit 22 and a switching element 30 provided between a first point of low potential L1 and the connection point V1 in the first inverter unit 22. The first inverter unit 22 further includes, for the coil 16, a switching element 32 provided between a first point of high potential H1 and a connection point W1 in the first inverter unit 22 and a switching element 34 provided between a first point of low potential L1 and the connection point W1 in the first inverter unit 22. The switching elements 24, 26, 28, 30, 32, 34 in the first inverter unit 22 are an example of the first switching elements.

The second inverter unit 36 is also a three-phase inverter that switches energization of the coils 12 to 16. The second inverter unit 36 includes, for the coil 12, a switching element 38 provided between a second point of high potential H2 and a connection point U2 in the second inverter unit 36 and a switching element 40 provided between a second point of low potential L2 and the connection point U2 in the second inverter unit 36. The second inverter unit 36 includes, for the coil 14, a switching element 42 provided between a second point of high potential H2 and a connection point V2 in the second inverter unit 36 and a switching element 44 provided between a second point of low potential L2 and the connection point V2 in the second inverter unit 36. The second inverter unit 36 further includes, for the coil 16, a switching element 46 provided between a second point of high potential H2 and a connection point W2 in the second inverter unit 36 and a switching element 48 provided between a second point of low potential L2 and the connection point W2 in the second inverter unit 36. The switching elements 38, 40, 42, 44, 46, 48 in the second inverter unit 36 are an example of the second switching elements.

The switching element 24 includes a transistor 24A and a diode 24B. Similarly, the switching elements 26 to 34 and 38 to 48 include transistors 26A to 34A and 38A to 48A and diode 28B to 34B and 38B to 48B, respectively.

The transistors 24A to 34A and 38A to 48A are insulated gate bipolar transistors (IGBTs), and switching on and off of them is controlled by the controller 60. Each of the transistors 24A to 34A and 38A to 48A allows current conduction from the high-side to the low-side when switched on and current conduction is interrupted when switched off. The transistors 24A to 34A and 38A to 48A are not limited to IGBTs, but may be MOSFETs or the like.

In the present embodiment, the switching elements 38 to 48 in the second inverter unit 36 are switching elements having a lower ON resistance (i.e., a lower conduction loss) than the switching elements 24 to 34 in the first inverter unit 22. As illustrated in FIG. 16, the switching elements are in the trade-off relationship between the ON resistance and the switching loss. Thus, the switching elements 24 to 34 in the first inverter unit 22 have higher conduction losses as compared with the switching elements 38-48 in the second inverter unit 36, but have lower switching losses (i.e., a higher switching speed) instead.

The diodes 24B to 34B and 38B to 48B are freewheeling diodes that are connected in parallel with the transistors 24A to 34A and 38A to 48A, respectively, and allow current conduction from the low-side to high-side. For example, like a parasitic diode of MOSFET or the like, the diodes 24B to 34B and 38B to 48B may be built in or externally attached to the transistors 24A to 34A and 38A to 48A, respectively.

In the first inverter unit 22, one end of the U-phase coil 12 is connected to the connection point U1 of the U-phase switching elements 24 and 26, and one end of the V-phase coil 14 is connected to the connection point V1 of the V-phase switching elements 28 and 30, and one end of the W-phase coil 16 is connected to the connection point W1 of the W-phase switching elements 32 and 34.

In the second inverter unit 36, the other end of the U-phase coil 12 is connected to the connection point U2 of the U-phase switching elements 38 and 40, the other end of the V-phase coil 14 is connected to the connection point V2 of the V-phase switching elements 42 and 44, and the other end of the W-phase coil 16 is connected to the connection point W2 of the W-phase switching elements 46 and 48.

The first point of high potential H1 in the first inverter unit 22 is connected to a positive terminal of a battery 72 in the first DC power source unit 70, and the high-side connection line 50 connects the first points of high potential H1 in the first inverter unit 22 and the second points of high potential H2 in the second inverter unit 36. The first points of low potential L1 in the first inverter unit 22 are connected to a negative terminal of the battery 72, and the low-side connection line 52 connects the first points of low potential L1 in the first inverter unit 22 and the second points of low potential L2 in the second inverter unit 36. The high-side connection line 50 is an example of a first connection line, and the low-side connection line 52 is an example of a second connection line.

The first DC power source unit 70 includes a smoothing capacitor 74 connected between the first inverter unit 22 and the battery 72. The DC voltage Vdc1 across the capacitor 74 is detected by a voltage detector 76.

The controller 60 is connected to the first inverter unit 22, the second inverter unit 36, the current detector 58, the voltage detector 76, and a rotating angle sensor (not shown). The controller 60 includes a central processing unit (CPU), a memory, and a non-volatile storage to perform various calculation processes. Various calculation processes may be implemented by software processing by the CPU executing pre-stored programs or by hardware processing by dedicated electronic circuits.

The controller 60 controls the first inverter unit 22 and the second inverter unit 36. More specifically, based on a drive command value for the motor generator 10 (an angular velocity command value ω* in the present embodiment), control signals are generated to control switching on and off of the transistors 24A to 34A and 38A to 48A of the switching elements 24 to 34 and 38 to 48. Then, gate signals to control switching on and off of the transistors 24A to 34A and 38A to 48A are generated in response to the generated control signals. Switching on and off the transistors 24A to 34A and 38A to 48A in response to the control signals implements conversion of the direct-current (DC) power of the battery 72 into the alternating-current (AC) power, thereby supplying the AC power to the motor generator 10. Driving of the motor generator 10 is controlled by the controller 60 via the first inverter unit 22 and the second inverter unit 36.

Operations in the first embodiment will now be described. In the first embodiment, the controller 60 drives the motor generator 10 by open-end connection driving. FIGS. 2A to 2D illustrate operations when open-end connection driving is performed on the circuit (including the switching elements 24, 26, 38, 40) corresponding to the coil 12. The open-end connection may be referred to as an open-end winding.

Figure 2A:
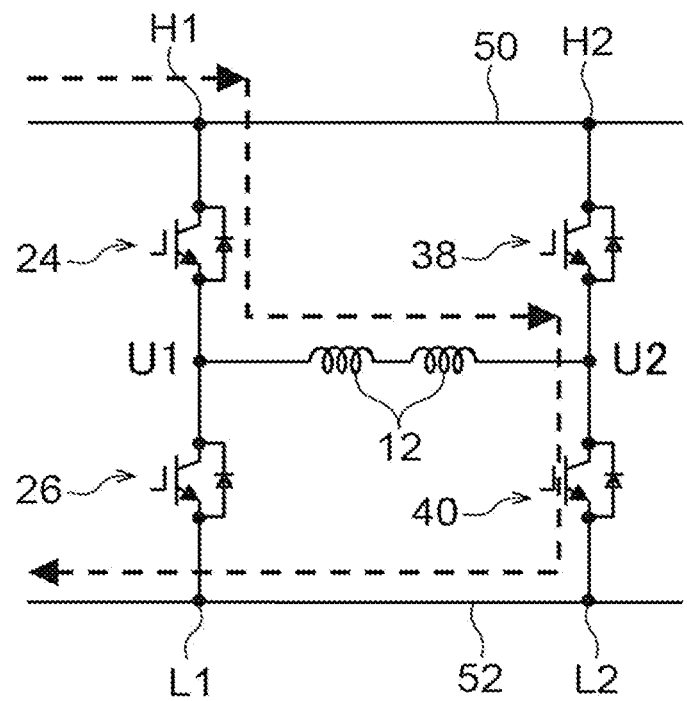
FIG. 2A is an illustration of an operation of a circuit corresponding to a U-phase coil.
Figure 2B:
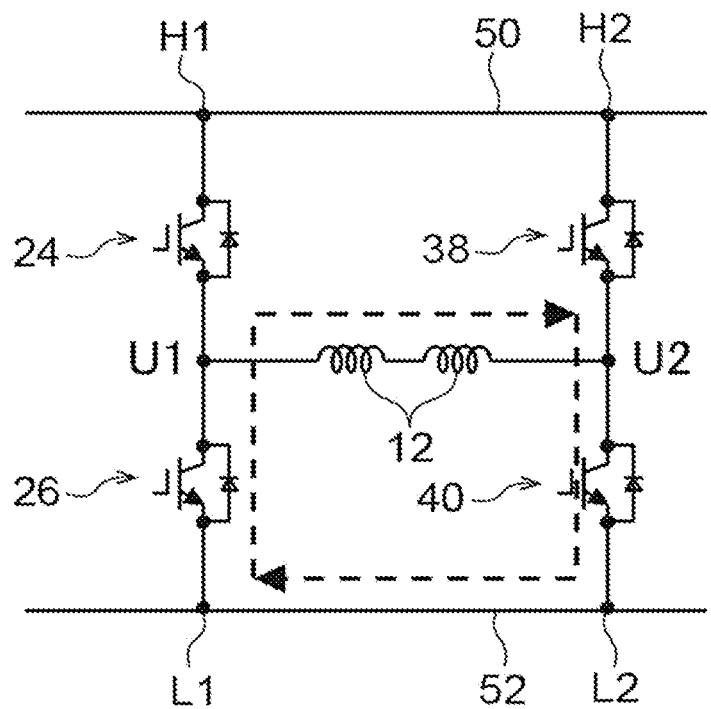
FIG. 2B is an illustration of an operation of the circuit corresponding to the U-phase coil.
Figure 2C:
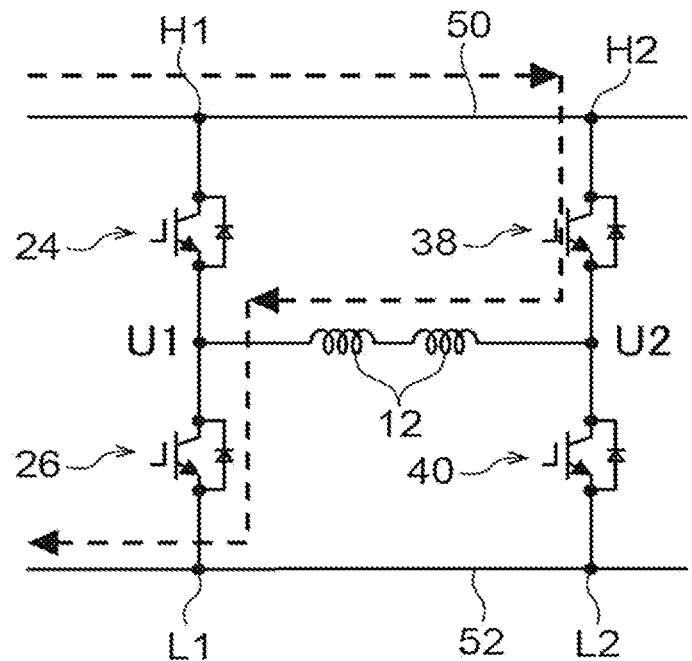
FIG. 2C is an illustration of an operation of the circuit corresponding to the U-phase coil.
Figure 2D:
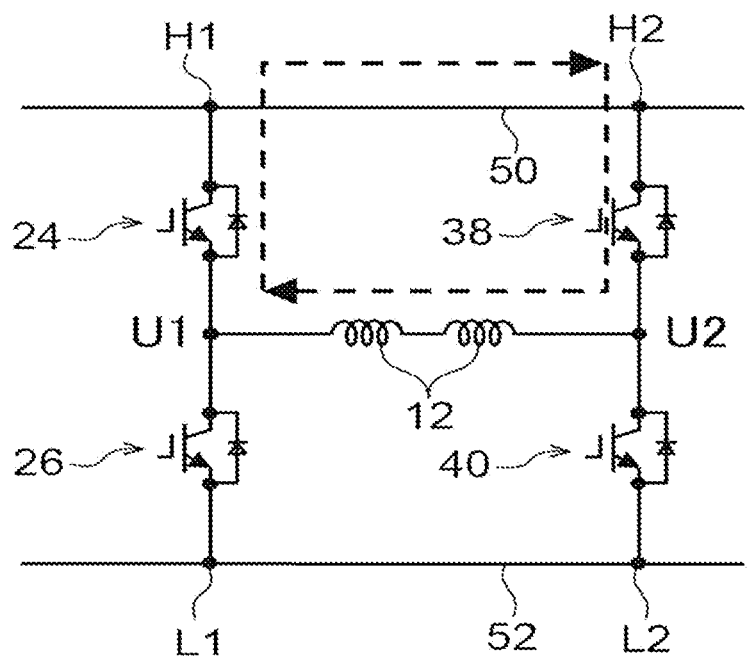
FIG. 2D is an illustration of an operation of the circuit corresponding to the U-phase coil.

As illustrated in FIG. 2A, when the switching elements 24, 40 (their transistors 24A, 40A) disposed diagonally across the coil 12 are switched on, the voltage of the battery 72 is applied to both ends of the coil 12 in the positive direction. Also, as illustrated in FIG. 2C, when the switching elements 38 and 26 (their transistors 38A and 26A) disposed diagonally across the coil 12 are switched on, the voltage of the battery 72 is applied to both ends of the coil 12 in the negative direction. On the other hand, when the low-side switching elements 26 and 40 (their transistors 24A and 40A) are switched on as illustrated in FIG. 2B, and when the switching elements 24 and 38 (their transistors 24A and 38A) are switched on as illustrated in FIG. 2D, no voltage is applied to both ends of the coil 12. Repeating these states enables application of an AC voltage to the coil 12. Similarly, an AC voltage is applied to the coils 14 and 16.

Figure 3:
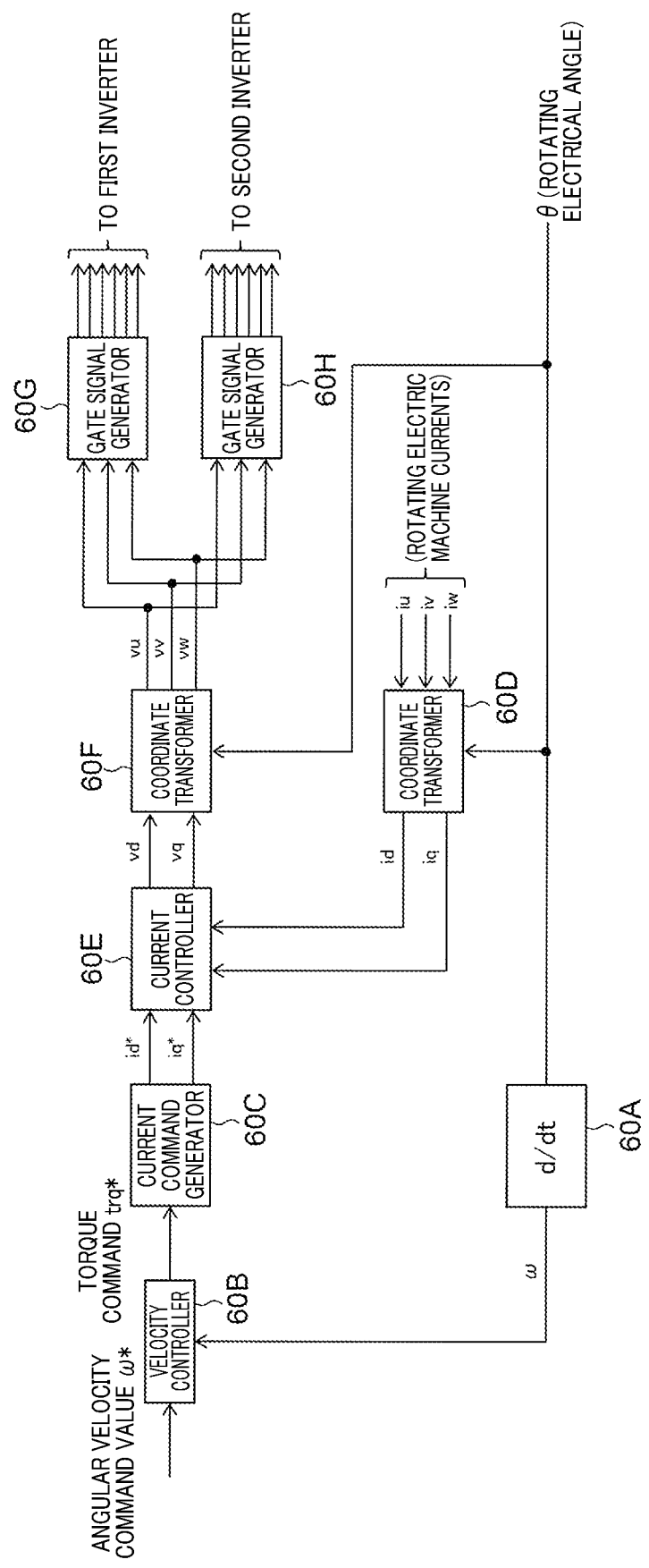
FIG. 3 is a functional block diagram of a controller according to the first embodiment.

In the first embodiment, the controller 60 includes, as functional blocks, a derivative calculator 60A, a velocity controller 60B, a current command generator 60C, a coordinate transformer 60D, a current controller 60E, a coordinate transformer 60F, and gate signal generators 60G, 60H, as illustrated in FIG. 3.

More specifically, the derivative calculator 60A outputs an angular velocity ω by differentiating a rotating electrical angle θ of the output shaft of the motor generator 10 detected by the rotating angle sensor with time. The velocity controller 60B compares the angular velocity ω output from the derivative calculator 60A with an angular velocity command value ω* which is an externally input drive command value of the motor generator 10, and generates a torque command value trq* in response to a result of comparison and outputs the torque command value trq*. The current command generator 60C generates d-phase and q-phase current command values id* and iq* from the torque command value trq* output from the velocity controller 60B and outputs the d-phase and q-phase current command values id* and iq*.

The coordinate transformer 60D converts the phase currents iu, iv, iw of the motor generator 10 detected by the current detector 58 into d-phase and q-phase currents id, iq based on the rotating electrical angle θ of the motor generator 10 and outputs the d-phase and q-phase currents id, iq. The current controller 60E compares the d-phase and q-phase currents id and iq output from the coordinate transformer 60D with the d-phase and q-phase current command value id* and iq* output from the current command generator 60C, and generates d-phase and q-phase output voltages vd, vq according to a comparison result and outputs the d-phase and q-phase output voltages vd, vq. The coordinate transformer 60F converts the d-phase and q-phase output voltages vd, vq output from the current controller 60E into u-phase, v-phase, and w-phase output voltages vu, vv, vw based on the rotating electrical angle θ of the motor generator 10 and outputs the u-phase, v-phase, and w-phase output voltages vu, vv, vw.

Figure 5A:
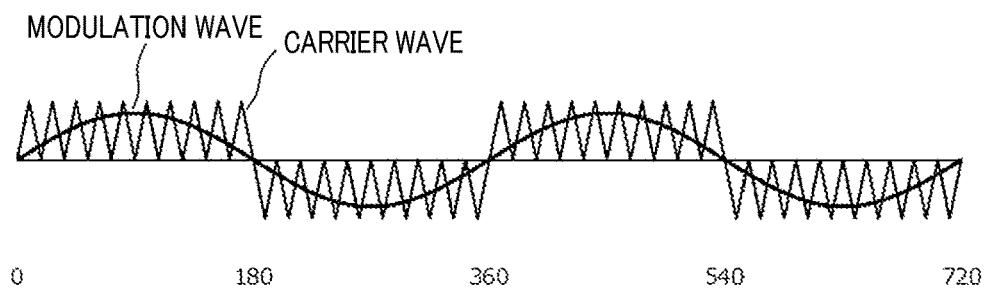
FIG. 5A is an example of waveforms of a carrier wave and a modulation wave used to generate a first gate signal.
Figure 5B:
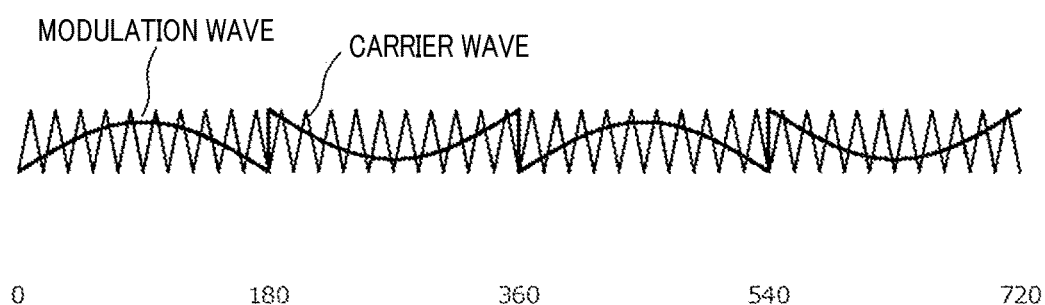
FIG. 5B is an example of waveforms of a carrier wave and a modulation wave used to generate a first gate signal.

The gate signal generator 60G generates first gate signals for controlling switching on and off of the switching elements 24 to 34 in the first inverter unit 22 based on the u-phase, v-phase, and w-phase output voltages vu, vv, vw output from the coordinate transformer 60F. In the present embodiment, the gate signal generator 60G generates, as the first gate signals, pulse-width modulation (PWM) signals for switching on and off the switching elements 24 to 34 by pulse-width modulation (PWM) at a switching frequency higher than the electric fundamental frequency of the motor generator 10. The PWM signals according to the present embodiment may be generated based on a result of comparison between a modulation wave and a carrier wave reversed in polarity each half cycle of the electric fundamental frequency as illustrated in FIG. 5A or a result of comparison between a carrier wave and a modulation wave reversed in polarity each half cycle of the electric fundamental frequency as illustrated in FIG. 5B. Alternatively, the PWM signals may be generated by space-vector modulation.

The gate signal generator 60H generates second gate signals for controlling switching on and off of the switching elements 38 to 48 in the second inverter unit 36 based on the u-phase, v-phase, and w-phase output voltages vu, vv, vw output from the coordinate transformer 60F. In the present embodiment, the gate signal generator 60H generates, as the second gate signals, PWM signals for switching on and off the switching elements 38 to 48 at a switching frequency equal to the electric fundamental frequency of the motor generator 10. The switching frequency for switching on and off the switching elements 38 to 48 only has to be lower than the switching frequency for switching on and off the switching elements 24 to 34, and may be higher than the electric fundamental frequency of the motor generator 10.

The first gate signals generated by the gate signal generator 60G are supplied to gates of the transistors 24A to 34A of the switching elements 24 to 34 in the first inverter unit 22, and switching on and off of the switching elements 24 to 34 in the first inverter unit 22 is thereby controlled. The second gate signals generated by the gate signal generator 60H are supplied to gates of the transistors 38A to 48A of the switching elements 38 to 48 in the second inverter unit 36, and switching on and off of the switching elements 38 to 48 in the first inverter unit 36 is thereby controlled. The motor generator 10 is driven by applying voltages to the u-phase, v-phase, and w-phase coils 12 to 16.

FIG. 4 illustrates drive waveforms for the inverter units 22 and 36, and a voltage waveform applied to each of the u-phase, v-phase, and w-phase coils (the u-phase coil 12 in this case) and phase current waveforms through the u-phase, v-phase, and w-phase coils of the motor generator 10. In each of the drawings including FIG. 4, illustrating drive waveforms, the dead time is not taken into account.

As described above, in the first embodiment, the first inverter unit 22 includes the plurality of switching elements 24 to 34. The plurality of switching elements 24 to 34 are operable to separately block and allow, for each phase of the motor generator 10 including the multi-phase coils 12, 14, 16, current conduction between the first point of high potential H1 and one end of a corresponding coil to the phase and current conduction between the one end of the corresponding coil to the phase and the first point of low potential L1. The second inverter unit 36 includes the plurality of switching elements 38 to 48. Each of the plurality of switching elements 38 to 48 has a lower ON resistance than the switching elements 24 to 34 in the first inverter unit 22. The plurality of switching elements 38 to 48 are operable to separately block and allow, for each phase of the motor generator 10, current conduction between the second point of high potential H2 and the other end of the corresponding coil to the phase and current conduction between the other end of the corresponding coil to the phase and the second point of low potential L2. The controller 60 switches on and off the respective switching elements 24 to 34 in the first inverter unit 22 at a switching frequency higher than the electric fundamental frequency of the motor generator 10, and switches on and off the respective switching elements 38 to 48 in the second inverter unit 36 at a switching frequency lower than the switching frequency at which to switch the switching elements 24-34 in the first inverter unit 22.

In this way, high frequency switching is performed in the first inverter unit 22, and low frequency switching is performed in the second inverter unit 36. Therefore, it is possible to use switching elements having a lower ON resistance than the switching elements 24 to 34 in the first inverter unit 22 as the switching elements 38 to 48 in the second inverter unit 36, which can reduce conduction losses while suppressing the increase in switching loss in the inverter units 22 and 36. Therefore, in such an embodiment where the motor generator 10 is used as the drive source of the motorized vehicle, the electricity efficiency of the motorized vehicle can be improved, which leads to a reduced amount of heating in the second inverter unit 36. A cooling arrangement for cooling the inverter units 22 and 36 can be simplified, which enables downsizing of the driving device 20.

In the first inverter unit 22 according to the first embodiment, the first points of high potential H1 are connected to a positive terminal of the first DC power source unit 70, and the first points of low potential L1 are connected to a negative terminal of the first DC power source unit 70. The first points of high potential H1 and the second points of high potential H2 are connected via the high-side connection line 50. The first points of low potential L1 and the second points of low potential L2 are connected via the low-side connection line 52. The first inverter unit 22 and the second inverter unit 36 are connected to the shared first DC power source unit 70 (see FIG. 1). This can provide a simpler configuration for supplying a DC voltage to the inverter units 22 and 36 as compared with a configuration described later where one switching element is provided along either or each of the high-side connection line 50 and the low-side connection line 52 or a configuration described later in which the inverter units 22 and 36 are connected to different power source units.

In the first embodiment, the switching elements 24 to 34 in the first inverter unit 22 are switched on and off by PWM control, and the switching elements 38 to 48 in the second inverter unit 36 are switched on and off at the electric fundamental frequency of the motor generator 10. The switching frequency at which to switch on and off the switching elements 38 to 48 in the second inverter unit 36 is minimized in this manner, such that the switching elements having a lower ON resistance can be used. Even with the switching frequency for the switching elements 38 to 48 in the second inverter unit 36 minimized, the motor generator 10 can be adequately driven by supplying the PWM signals to the switching elements 24 to 34 in the first inverter unit 22 to switch on and off the switching elements 24 to 34.

Further, in the first embodiment, the PWM signals to be supplied to the switching elements 24 to 34 in the first inverter unit 22 are generated based on a comparison between the carrier wave and the modulation wave reversed in polarity each half cycle of the electric fundamental frequency of the motor generator 10 or a comparison between the modulation wave and the carrier wave reversed in polarity each half cycle of the electric fundamental frequency of the motor generator 10. With this configuration, even in cases where the switching elements 38 to 48 in the second inverter unit 36 are switched on and off at the electric fundamental frequency of the motor generator 10, the PWM signals for adequately driving the motor generator 10 can be generated.

Figure 6:
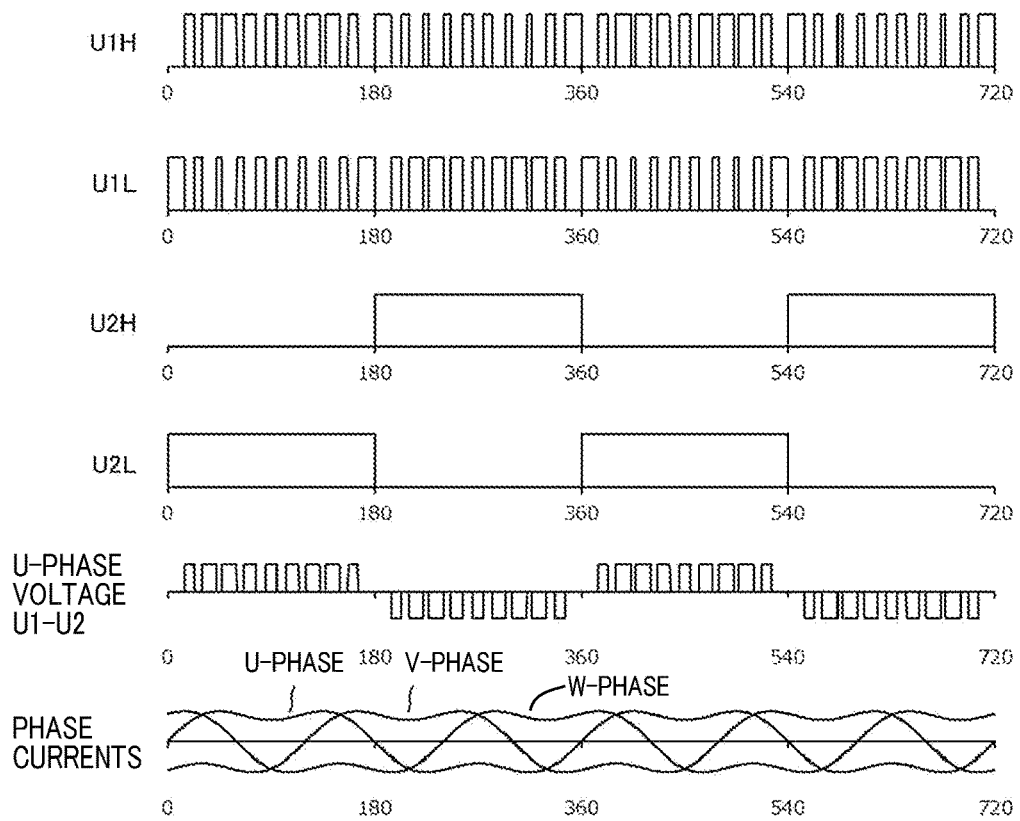
FIG. 6 is a timing chart illustrating drive waveforms for the inverter units, applied voltage waveforms and phase current waveforms to the coils of the motor generator when conducting unbalanced currents to the coils of the respective phases.

In the first embodiment, as described above, the first points of high potential H1 and the second points of high potential H2 are connected via the high-side connection line 50. The first points of low potential L1 and the second points of low potential L2 are connected via the low-side connection line 52. The first inverter unit 22 and the second inverter unit 36 are connected to the shared first DC power source unit 70. For each of the U-, V-, and W-phase coils of the motor generator 10, the switching elements are connected to the coil to form a separate H-bridge type circuit. This configuration enables separate control of the current flowing through each coil of the motor generator 10. Therefore, as illustrated in FIG. 6, it is possible to conduct unbalanced currents such that a sum of the currents of the respective phases flowing through the respective coils of the motor generator 10 is not zero. Conducting such unbalanced currents through the coils of the motor generator 10 can enhance the maximum torque of the motor generator 10 without increasing the maximum value of current flowing through each switching element.

Second Embodiment

A second embodiment of this disclosure will now be described. The same elements as in the first embodiment are assigned the same reference numbers and duplicate description related thereto will be omitted.

Figure 7:
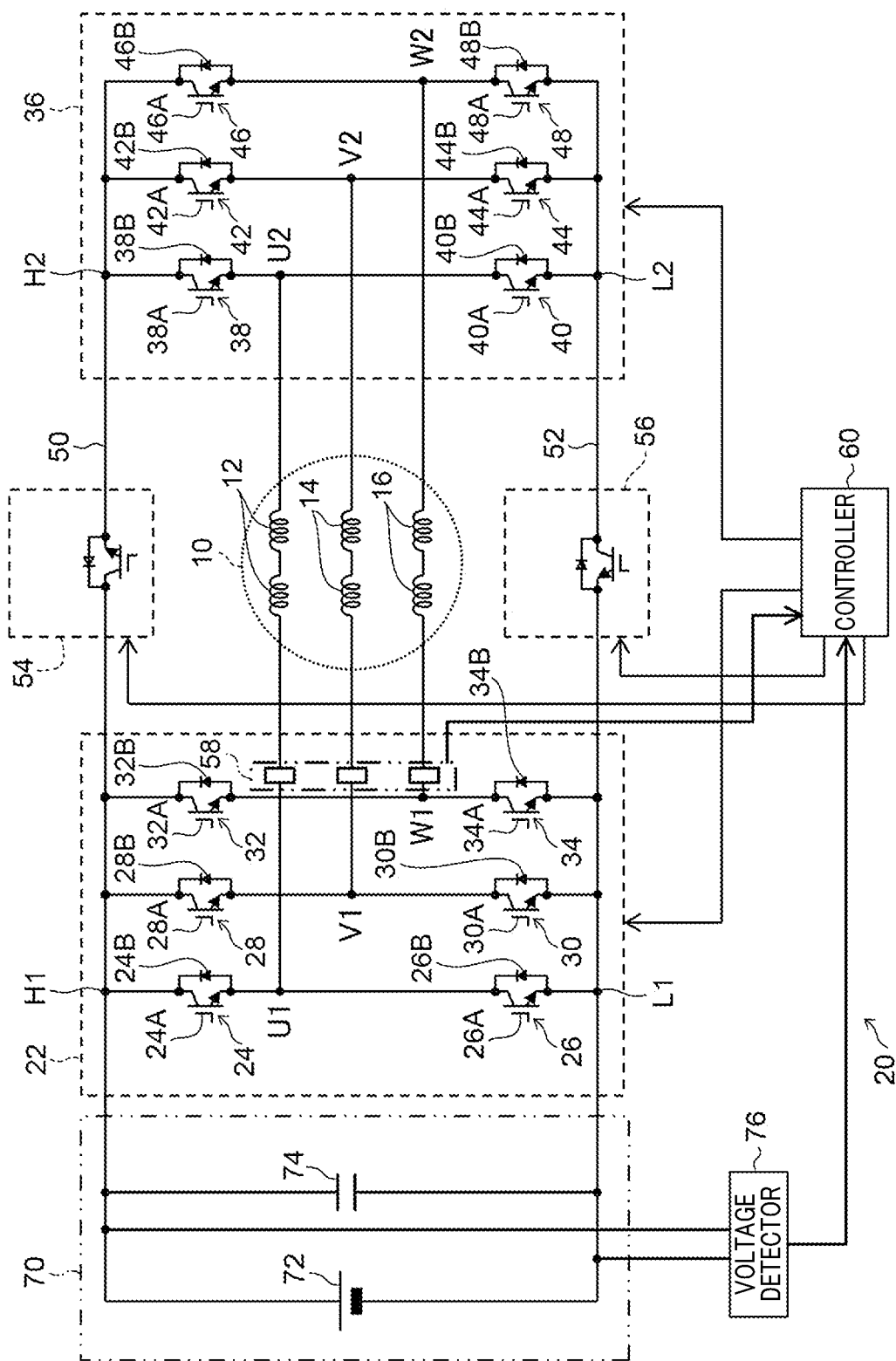
FIG. 7 is a schematic diagram of a driving device for a rotating electric machine according to a second embodiment.

In the second embodiment, as illustrated in FIG. 7, a high-side link switching element 54 for opening and closing the high-side connection line 50 is provided along the high-side connection line 50, and a low-side link switching element 56 for opening and closing the low-side connection line 52 is provided along the low-side connection line 52. The link switching elements 54 and 56 have a lower ON resistance (conduction loss) than the switching elements 24 to 34 in the first inverter unit 22. Each of the link switching elements 54 and 56 is an example of a third switching element. The link switching elements 54 and 56 are connected to the controller 60, whereby the controller 60 controls switching on and off of the link switching elements 54 and 56.

Figure 10:
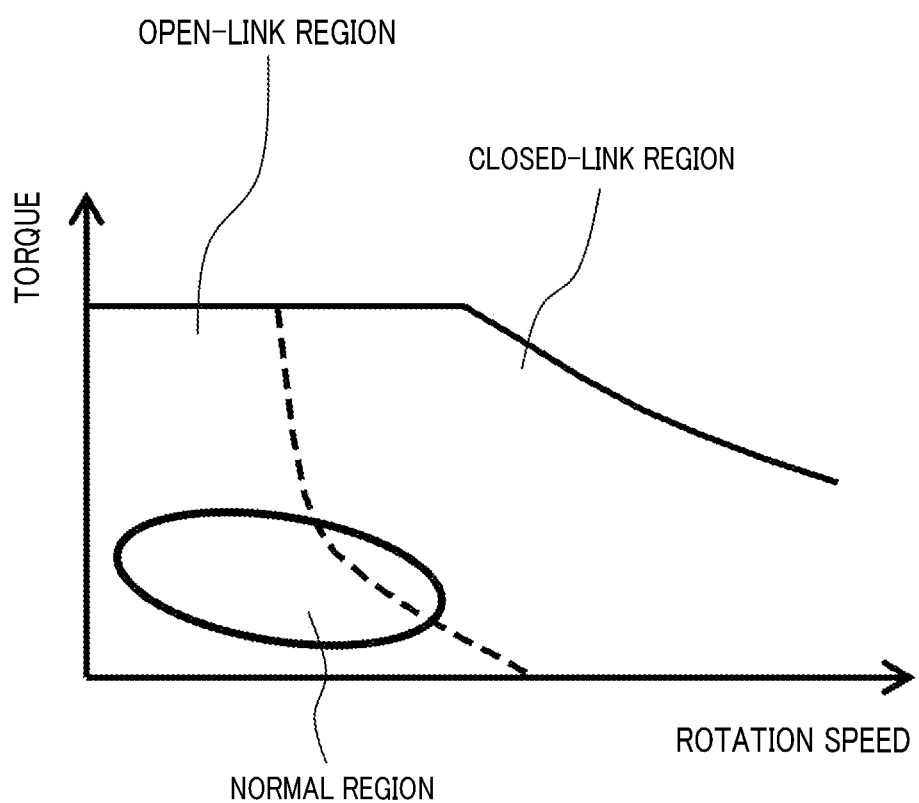
FIG. 10 is a diagram illustrating operating regions on output characteristics of the motor generator.

In the second embodiment, as illustrated in FIG. 10, the controller 60 switches on and off the link switching elements 54 and 56 in a low to moderate speed rotation range of the motor generator 10 (referred to as an open-link region). In an operating region on the higher speed side of the open-link region (referred to as a closed-link region), the controller 60 switches on each of the link switching elements 54 and 56. The operations in the closed-link region are the same as described regarding FIGS. 2A to 2D in the first embodiment.

Figure 8:
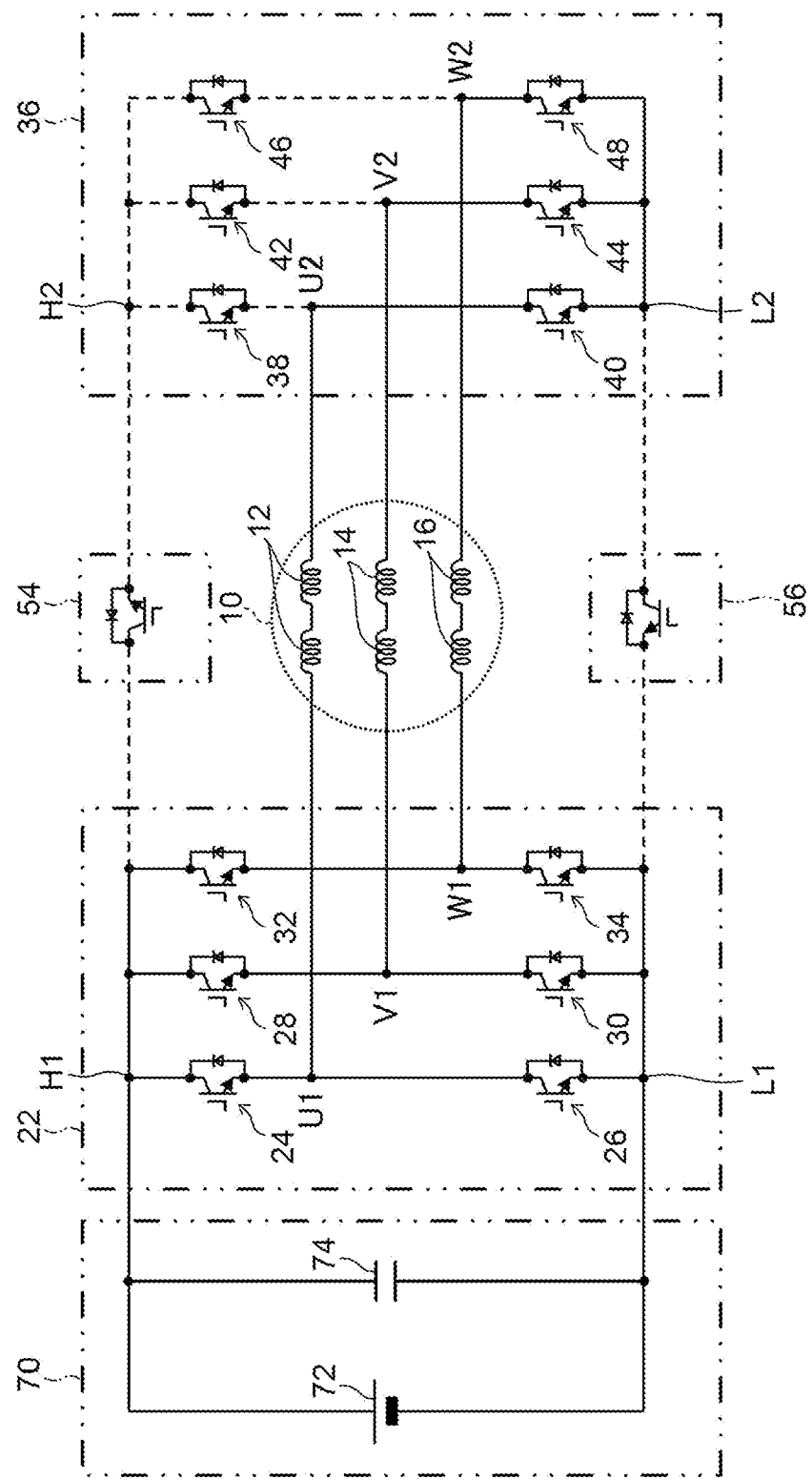
FIG. 8 is an illustration of an example operation in an open-link region.
Figure 9:
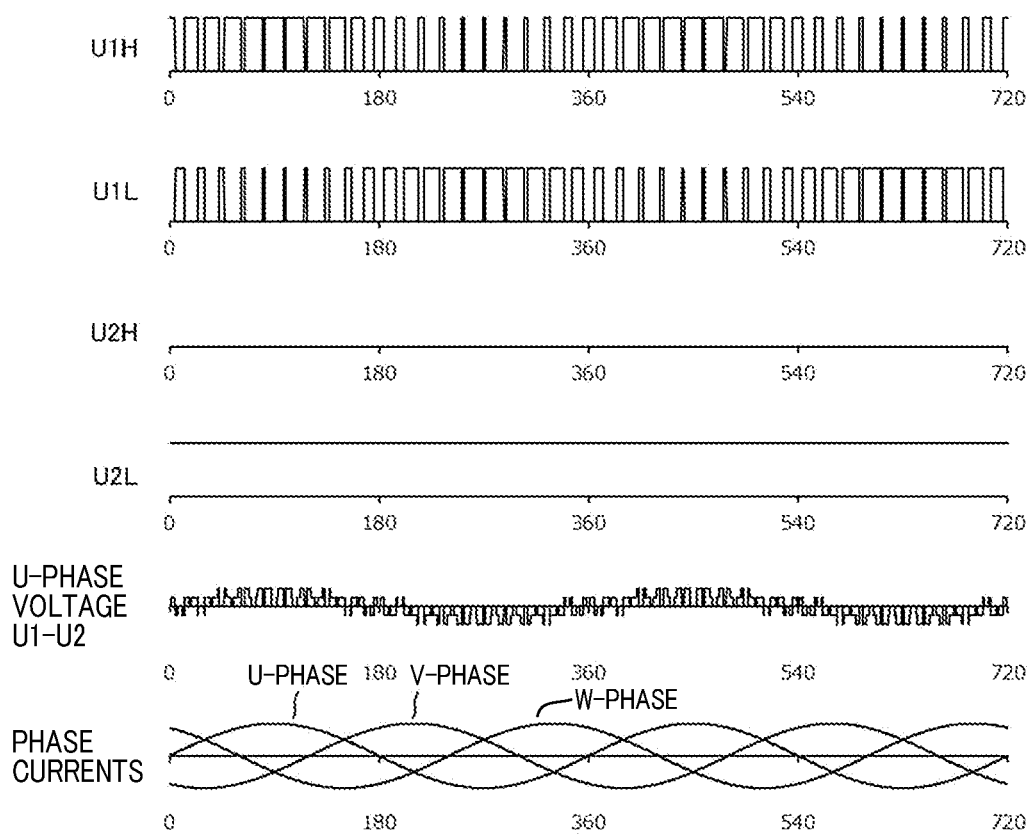
FIG. 9 is a timing chart illustrating drive waveforms for inverter units, applied voltage waveforms and phase current waveforms supplied to coils of the motor generator in the open-link region.

FIG. 8 illustrates an example of operations in the open-link region, where the controller 60 switches off each of the link switching elements 54 and 56. The controller 60 further switches off each of the high-side switching elements 38, 42, and 46 and switches on each of the low-side switching elements 40, 44, and 48 (this state being referred to as a first on-off state), thereby causing the second inverter unit 36 to operate as a neutral point of the coils 12 to 16 of the motor generator 10. FIG. 9 illustrates drive waveforms for the inverter units 22 and 36, applied voltage waveforms and phase current waveforms to the coils of the motor generator 10 in the open-link region.

Causing the second inverter unit 36 to operate as the neutral point of the coils 12 to 16 of the motor generator 10 may also be implemented by switching on each of the high-side switching elements 38, 42, 46 in the second inverter unit 36 and switching off each of the low-side switching elements 40, 44, 48 (this state being referred to as a second on-off state). In addition, the first and second on-off states may be interchanged as appropriate in response to a thermal condition of the switching elements 38, 42, 46 and the switching elements 40, 44, 48, or all of the switching elements 38 to 48 in the second inverter unit 36 may be switched on.

Figure 11:
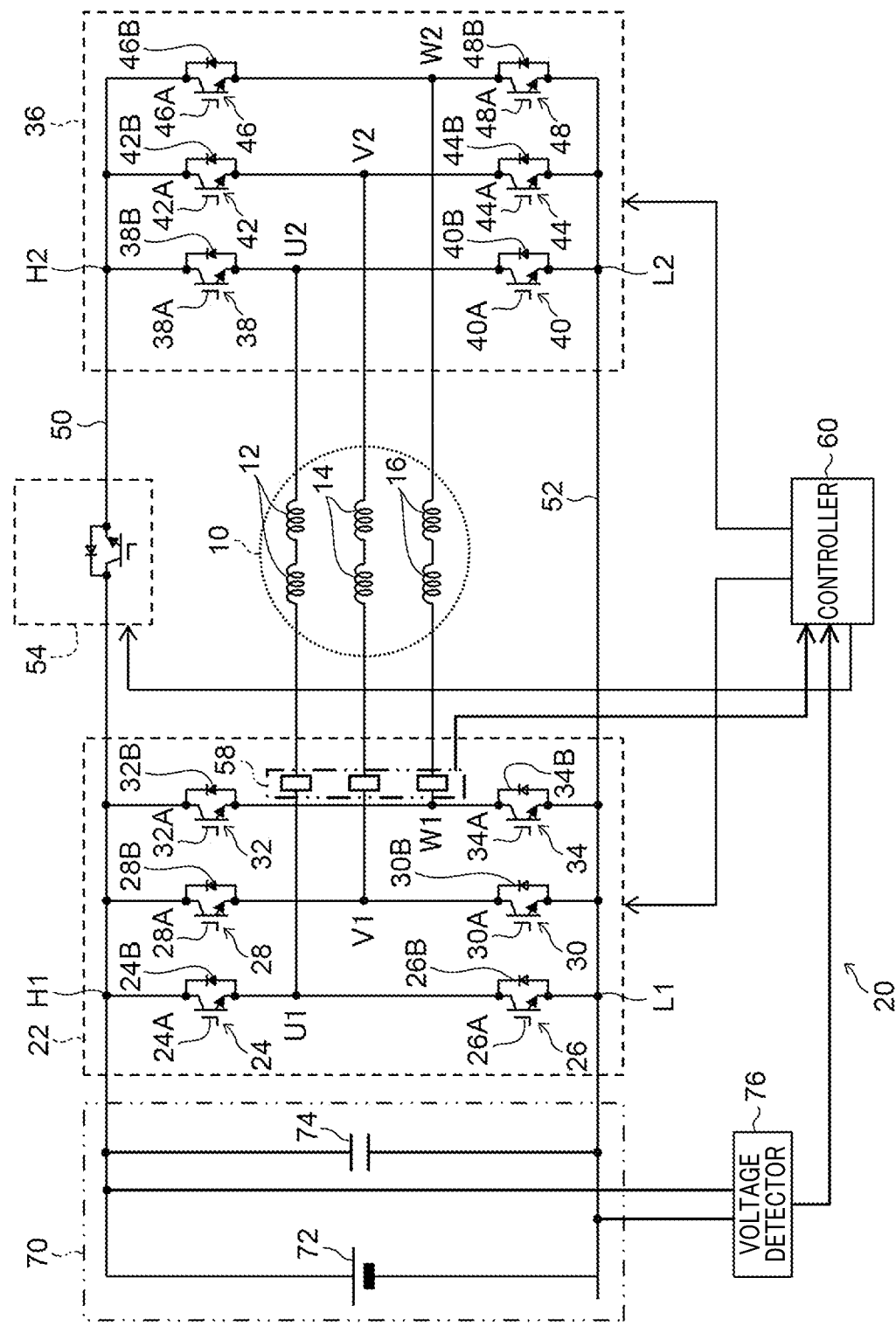
FIG. 11 is a schematic diagram of a driving device for a rotating electric machine provided with only one link switching element according to a modification to the second embodiment.

The second embodiment is not limited to a configuration where each of the connection lines 50 and 52 is provided with the link switching element. In an example modification, as illustrated in FIG. 11, the low-side link switching element 56 may be eliminated and only the high-side link switching element 54 may be provided along the high-side connection line 50. In this modification, causing the second inverter unit 36 to operate as the neutral point of the coils 12 to 16 of the motor generator 10 may be implemented by placing the switching elements 38 to 48 in the second inverter unit 36 in the second on-off state. Although not shown, in another modification, the high-side link switching element 54 may be eliminated and only the low-side link switching element 56 may be provided along the low-side connection line 52. In this modification, causing the second inverter unit 36 to operate as the neutral point of the coils 12 to 16 of the motor generator 10 may be implemented by placing the switching elements 38 to 48 in the second inverter unit 36 in the first on-off state.

As above, in the second embodiment, the first points of high potential H1 in the first inverter unit 22 are connected to the positive terminal of the first DC power source unit 70, and the first points of low potential L1 are connected to the negative terminal of the first DC power source unit 70. The high-side connection line 50 is provided to connect the first points of high potential H1 and the second points of high potential H2, and the low-side connection line 52 is provided to connect the first points of low potential L1 and the second points of low potential L2. In addition, one link switching element 54 or 56 is provided along either or each of the high-side connection line 50 and the low-side connection line 52. The controller 60 controls switching on and off of the at least one link switching element 54, 56. With this configuration, it is possible to switch between either star connection driving or open-end connection driving of the motor generator 10 by switching on or off each of the link switching elements 54 and 56. The open-end connection is also referred to as open-end winding or the like.

In the second embodiment, while the link switching elements 54, 56 are off, the controller 60 causes the second inverter unit 36 to operate as the neutral point of the coils 12 to 16 of the motor generator 10. In this case, the motor generator 10 is driven by star-connection driving. In star-connection driving, the power source voltage is divided by the plurality of phase windings, such that the amplitude of applied voltage to each of the coils 12 to 16 of the motor generator 10 is reduced as compared to in open-end connection driving, which can reduce the ripple in the current through each of the coils 12 to 16. With this configuration, in a driving region where the link switching elements 54, 56 are off, that is, in the low to moderate speed rotation range of the motor generator 10, harmonic components included in the current flowing through each coil 12 to 16 of the motor generator 10 can be reduced, and the iron loss of the motor generator 10 can be reduced. Therefore, in cases where the motor generator 10 is used as the drive source of the motorized vehicle, it is possible to enhance the electricity efficiency in the low to moderate speed rotation range that is often used in motorized vehicles.

In the second embodiment, while the link switching elements 54, 56 are on, the controller 60 switches on and off the switching elements 24 to 34 in the first inverter unit 22 by PWM control and switches on and off the switching elements 38 to 48 in the second inverter unit 36 at the electric fundamental frequency of the motor generator 10. In this case, the motor generator 10 is driven by open-end connection driving. In open-end connection driving, it is possible to increase the amplitude of applied voltage to each of the coils 12 to 16 of the motor generator 10 as compared to in star-connection driving. This can enhance the torque of the motor generator 10 in a driving region where the link switching elements 54, 56 are on, that is, in the high speed rotation range of the motor generator 10.

In the second embodiment, each of the link switching elements 54, 56 has a lower ON resistance than the switching elements 24 to 34 in the first inverter unit 22. This configuration can reduce conduction losses in the open-end connection driving implemented by switching on the link switching elements 54, 56. A configuration where only one link switching element is provided along either one of the connection lines 50, 52 can further reduce the conduction losses in the open-end connection driving implemented by switching on the link switching element.

Third Embodiment

A third embodiment of this disclosure will now be described. The same elements as in the first and second embodiments are assigned the same reference numbers and duplicate description related thereto will be omitted.

Figure 12:
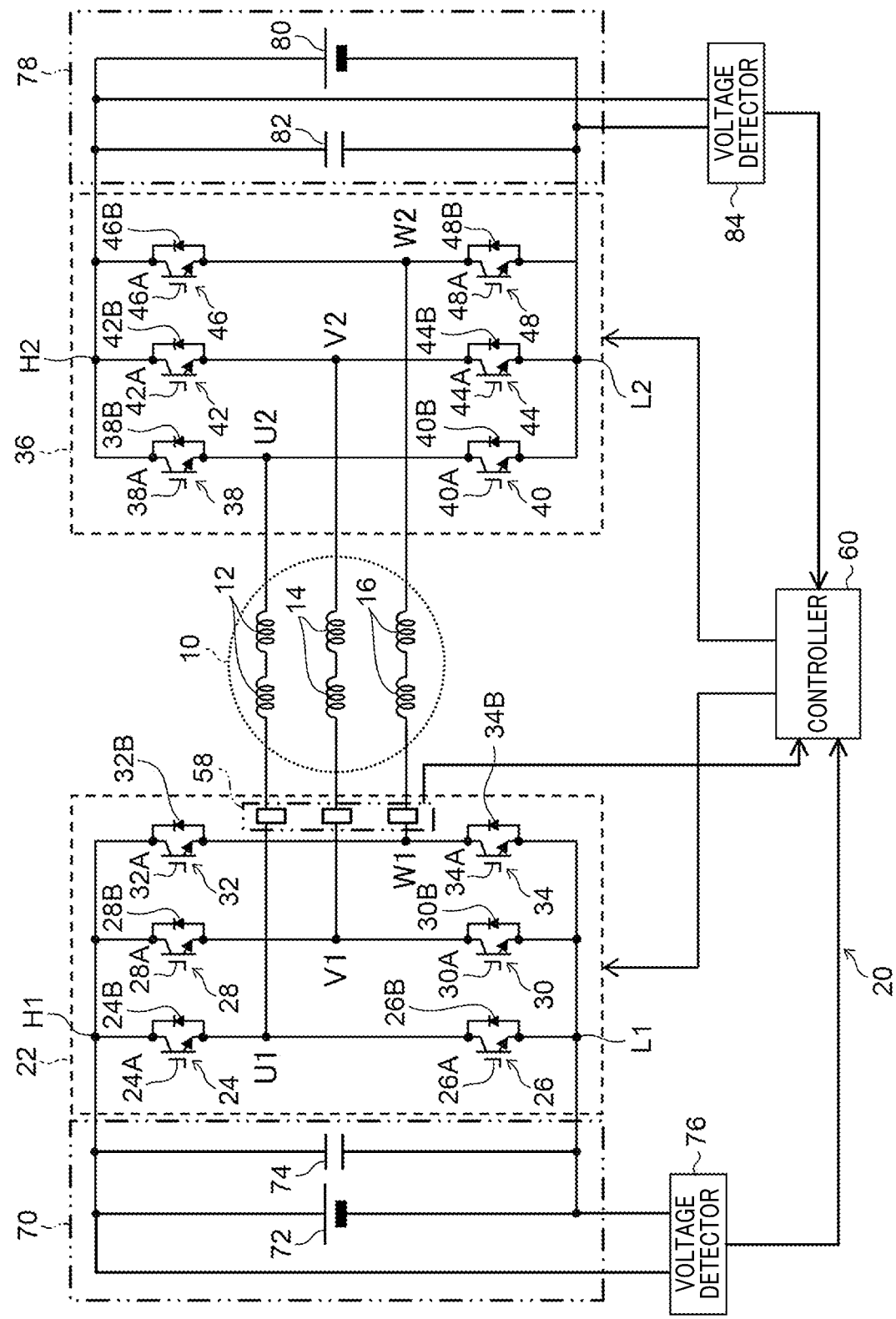
FIG. 12 is a schematic diagram of a driving device for a rotating electric machine according to a third embodiment.

As illustrated in FIG. 12, the high-side connection line 50 and the low-side connection line 52 are eliminated in the third embodiment. The second points of high potential H2 in the second inverter unit 36 are connected to a positive terminal of a battery 80 in a second DC power source unit 78. The second points of low potential L2 in the second inverter unit 36 are connected to a negative terminal of the battery 80. The second DC power source unit 78 includes a smoothing capacitor 82 connected between the second inverter unit 36 and the battery 80. A DC voltage Vdc2 across the inverter 82 is detected by a voltage detector 84. The DC voltage Vdc2 of the second DC power source unit 78 may be equal to or different from the DC voltage Vdc1 in the first DC power source unit 70.

Figure 15:
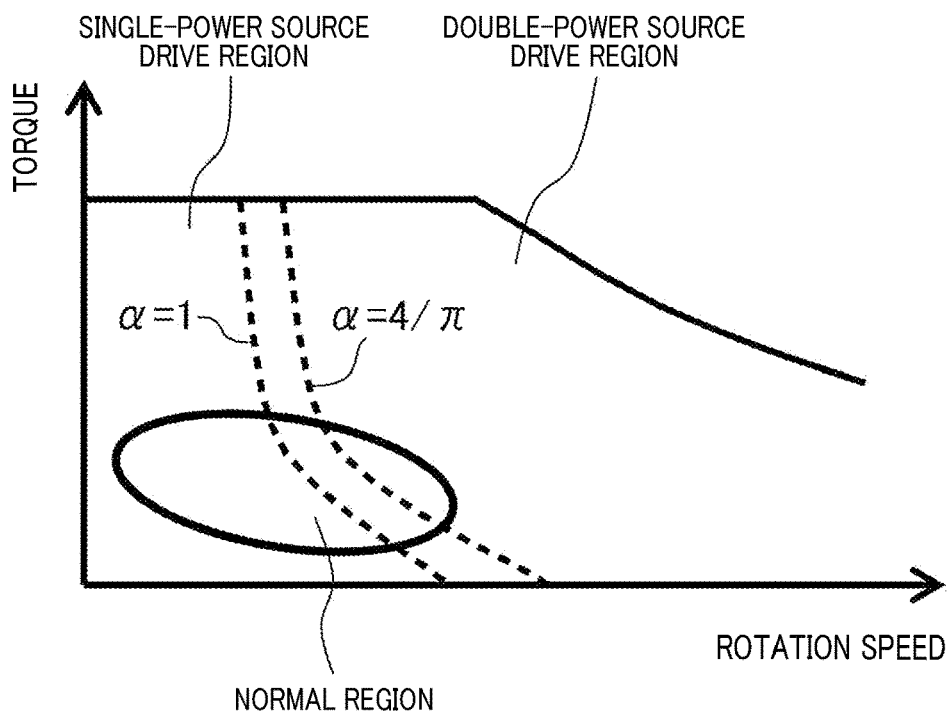
FIG. 15 is a diagram illustrating operating regions on output characteristics of the motor generator.

In the third embodiment, as illustrated in FIG. 15, the controller 60 drives the motor generator 10 only by the DC voltage of the first DC power source unit 70 in a region where the modulation rate α is less than a predetermined value, which corresponds to the low to moderate speed rotation range of the motor generator 10 (corresponding to single-power-source drive region). The controller 60 drives the motor generator 10 by the DC voltages of the first DC power source unit 70 and the second DC power source unit 78 in a region where the modulation rate α is equal to or greater than the predetermined value, which corresponds to the high speed rotation range of the motor generator 10 (corresponding to double-power-source drive region).

The modulation rate α is expressed by the following equation (1).

$$\text{Modulation Rate } \alpha = \text{(fundamental component amplitude of phase winding voltage)}/\text{(DC voltage Vdc 1 of the first DC power source unit}/2) \quad (1)$$

The predetermined value that defines a boundary between the single-power-source drive region and the double-power-source drive region may be set to a value in a range of 1 to 4/n.

Figure 13:
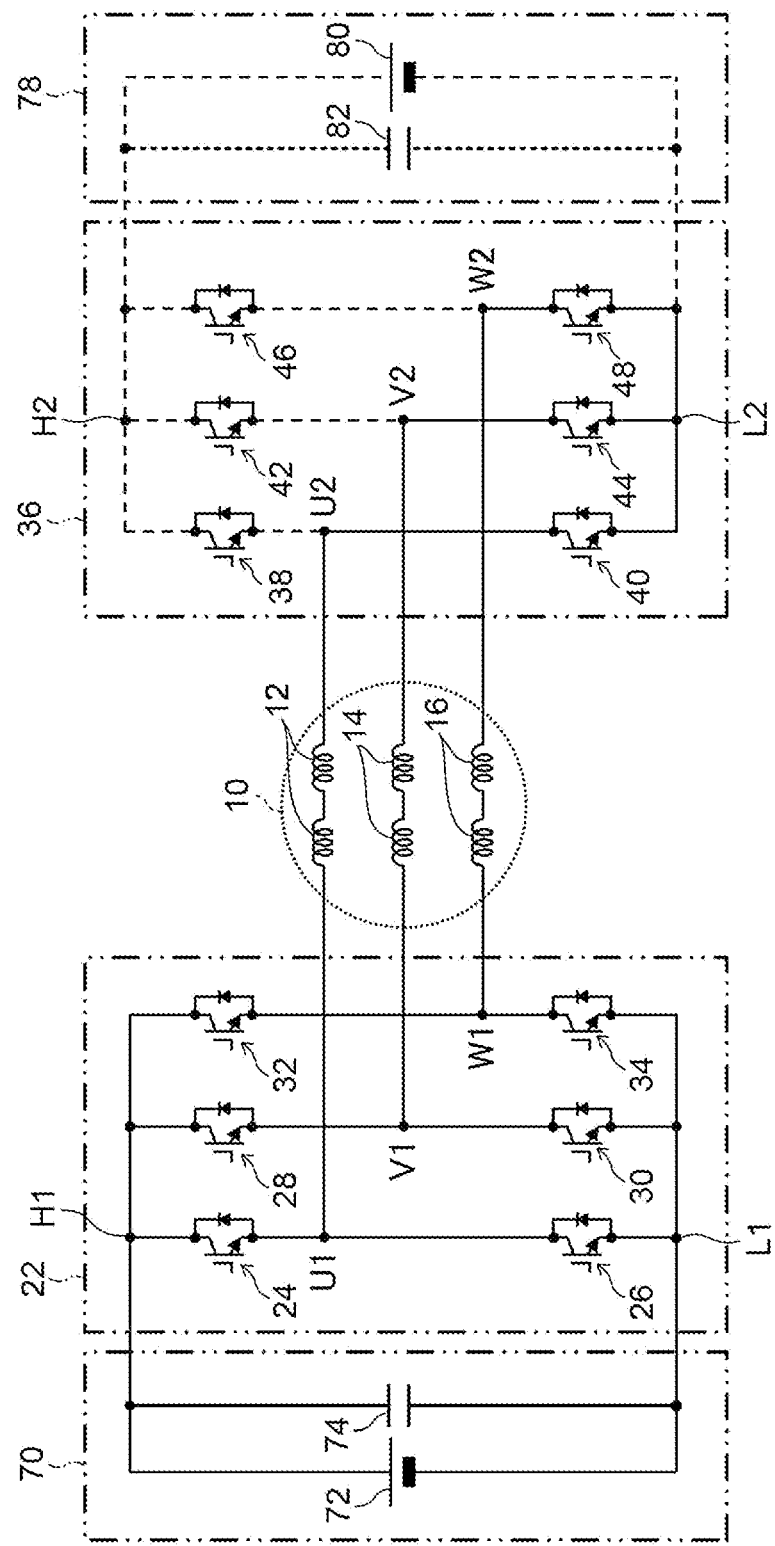
FIG. 13 is an illustration of an example operation in a single-power-source drive region.

FIG. 13 illustrates an example of operations in the single-power-source drive region, where the controller 60 switches off the high-side switching elements 38, 42, 46 in the second inverter unit 36 and switches on the low-side switching elements 40, 44, 48 (this state corresponding to the first on-off state). This causes the second inverter unit 36 to operate as the neutral point of the coils 12 to 16 of the motor generator 10, and the DC voltage of the first DC power source unit 70 is applied to the respective coils 12 to 16 of the motor generator 10.

Causing the second inverter unit 36 to operate as the neutral point of the coils 12 to 16 of the motor generator 10 may also be implemented by switching on each of the high-side switching elements 38, 42, and 46 of the second inverter unit 36 and switching off each of the low-side switching elements 40, 44, 48 (this state corresponding to the second on-off state). In addition, the first and second on-off states may be interchanged as appropriate in response to the thermal conditions of the switching elements 38, 42, 46 and the switching elements 40, 44, 48.

Figure 14:
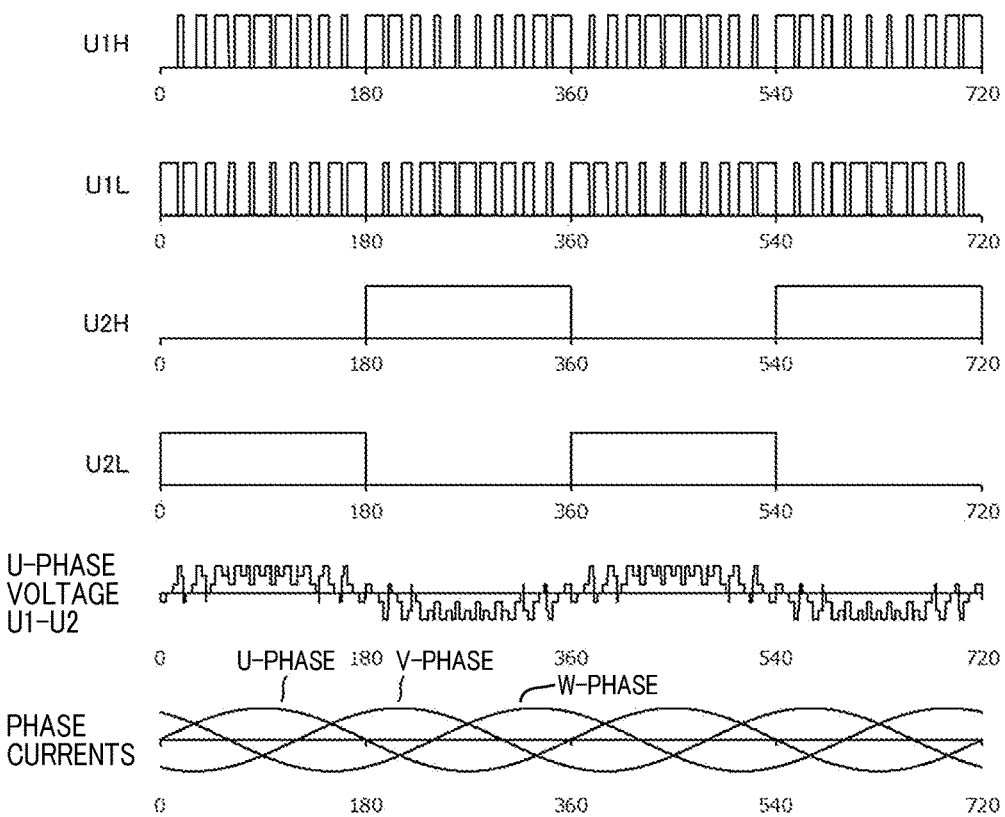
FIG. 14 is a timing chart illustrating drive waveforms for inverter units, applied voltage waveforms and phase current waveforms supplied to coils of a motor generator in a double-power-source drive region.

In the double-power-source drive region, the controller 60 switches on and off the switching elements 24 to 34 in the first inverter unit 22 by PWM control and switches on and off the switching elements 38 to 48 in the second inverter unit 36 at the electric fundamental frequency of the motor generator 10, whereby the DC voltage of the first DC power source unit 70 and the DC voltage of the second DC power source unit 78 can be applied in series to the coils of the motor generator 10. FIG. 14 illustrates drive waveforms for the inverter units 22 and 36, applied voltage waveforms and phase current waveforms to the coils of the motor generator 10 in the double-power-source drive region.

As above, in the third embodiment, the first points of high potential H1 in the first inverter unit 22 are connected to the positive terminal of the first DC power source unit 70, and the first points of low potential L1 in the first inverter unit 22 are connected to the negative terminal of the first DC power source unit 70. The second points of high potential H2 in the second inverter unit 36 are connected to the positive terminal of the second DC power source unit 78, and the second points of low potential L2 in the second inverter unit 36 are connected to the negative terminal of the second DC power source unit 78. In this configuration, in contrast to the configuration where the first inverter unit 22 and the second inverter unit 36 are connected via the high-side connection line 50 and the low-side connection line 52 to share the direct-current potential (see FIGS. 1 and 7), there are no circulating paths (i.e., the connection lines 50, 52) for zero-sequence current. This enables avoidance of the increase in loss and deterioration of noise caused by the zero-sequence currents.

Further, in the third embodiment, when the modulation rate α calculated from the fundamental component amplitude of the phase winding voltage of the motor generator 10 and the DC voltage Vdc1 of the first DC power source unit 70 is less than the predetermined value, the controller 60 causes the second inverter unit 36 to operate as the neutral point of the coils 12 to 16 of the motor generator 10. In this case, only the voltage of the first DC power source unit 70 is applied to the coils 12 to 16 of the motor generator 10, which leads to reduced amplitude of the applied voltage to the coils 12 to 16 of the motor generator 10 and thus leads to reduced ripple in the current flowing through each coil 12 to 16. Therefore, in the single-power-source drive region, that is, in the low to moderate speed rotation range of the motor generator 10, harmonic components included in the current flowing through each coil 12 to 16 of the motor generator 10 can be reduced, and the iron losses of the motor generator 10 can thus be reduced. Therefore, in the configuration where the motor generator 10 is used as the drive source of the motorized vehicle, it is possible to enhance the electricity efficiency in the low to moderate speed rotation range often used in the motorized vehicle.

Further, in the third embodiment, when the modulation rate α calculated from the fundamental component amplitude of the phase winding voltage of the motor generator 10 and the DC voltage Vdc1 of the first DC power source unit 70 is equal to or greater than the predetermined value, the controller 60 switches on and off the switching elements 24 to 34 in the first inverter unit 22 by PWM control and switches on and off the switching elements 38 to 48 in the second inverter unit 36 at the electric fundamental frequency of the motor generator 10, whereby, in the double-power-source drive region, that is, in the high speed rotation range of the motor generator 10, it is possible to increase the amplitude of the applied voltage to each coil 12 to 16 of the motor generator 10 and thus enhance the torque of the motor generator 10.

In the embodiments set forth above, losses in the second inverter unit 36 are smaller than in the first inverter unit 22. Therefore, for the purpose of cooling the inverter units, it is desired to simplify cooling of the second inverter unit 36 and have a configuration in which the first inverter unit 22 can be cooled more than the second inverter unit 36. For example, in a configuration where the coolant flow path in the first inverter unit 22 and the coolant flow path in the second inverter unit 36 are connected in series, it is preferable to place the coolant flow path in the first inverter unit 22 upstream of the coolant flow path in the second inverter unit 36 along the coolant flow direction. In a configuration where the coolant flow path in the first inverter unit 22 and the coolant flow path in the second inverter unit 36 are connected in parallel, it is preferable to make the flow path resistance of the coolant flow path in the first inverter unit 22 lower than the flow path resistance in the coolant flow path of the second inverter unit 36. In any case, the heat-transfer coefficient between the switching elements in the second inverter unit 36 and the coolant flowing through the coolant flow path may be lower than the heat-transfer coefficient between the switching elements in the first inverter unit 22 and the coolant flowing through the coolant flow path.

Further, the number of phases of the rotating electric machine may not be limited to three. The type of the rotating electric machine may be a synchronous machine or an induction machine.

While the present disclosure has been described with reference to the embodiments, it is understood that the present disclosure is not limited to such embodiments and structures. The present disclosure includes various modifications and modifications within the equivalent range. Additionally, various combinations and forms, as well as other combinations and forms including only one element, more or less, are within the scope and spirit of the present disclosure.

What is claimed is:

1. A driving device for a rotating electric machine, comprising:
   a first inverter unit formed of a plurality of first switching elements, the plurality of first switching elements being operable to separately block and allow, for each phase of the rotating electric machine including multi-phase windings, current conduction between a first point of high potential and one end of a corresponding one of the windings to the phase and current conduction between the one end of the corresponding one of the windings to the phase and a first point of low potential;
   a second inverter unit formed of a plurality of second switching elements, each of the plurality of second switching elements having a lower ON resistance than the respective first switching elements, the plurality of second switching elements being operable to separately block and allow, for each phase of the rotating electric machine, current conduction between a second point of high potential and an other end of the corresponding one of the windings to the phase and current conduction between the other end of the corresponding one of the windings to the phase and a second point of low potential; and
   a controller configured to switch on and off the respective first switching elements in the first inverter unit at a switching frequency higher than an electric fundamental frequency of the rotating electric machine and switch on and off the respective second switching elements in the second inverter unit at a switching frequency lower than the switching frequency at which to switch on and off the respective first switching elements in the first inverter unit.

2. The driving device according to claim 1, wherein the first points of high potential in the first inverter unit are connected to a positive terminal of a first direct-current (DC) power source unit, and the first points of low potential in the first inverter unit are connected to a negative terminal of the first DC power source unit, and the driving device further comprises:
   a first connection line connecting the first points of high potential in the first inverter unit and the second points of high potential in the second inverter unit; and
   a second connection line connecting the first points of low potential in the first inverter unit and the second points of low potential in the second inverter unit.

3. The driving device according to claim 1, wherein the first points of high potential in the first inverter unit are connected to a positive terminal of a first direct-current (DC) power source unit, and the first points of low potential in the first inverter unit are connected to a negative terminal of the first DC power source unit, the driving device further comprises:
   a first connection line connecting the first points of high potential in the first inverter unit and the second points of high potential in the second inverter unit;
   a second connection line connecting the first points of low potential in the first inverter unit and the second points of low potential in the second inverter unit; and
   a third switching element provided along either or each of the first connection line and the second connection line, and
   the controller is configured to control switching on and off of the third switching element.

4. The driving device according to claim 1, wherein the first points of high potential in the first inverter unit are connected to a positive terminal of a first direct-current (DC) power source unit and the first points of low potential in the first inverter unit are connected to a negative terminal of the first DC power source unit, and the second points of high potential in the second inverter unit are connected to a positive terminal of a second direct-current (DC) power source unit and the second points of low potential in the second inverter unit are connected to a negative terminal of the second DC power source unit.

5. The driving device according to claim 2, wherein the controller is configured to switch on and off each of the plurality of the first switching elements by PWM control and switch on and off each of the plurality of the second switching elements at the electric fundamental frequency of the rotating electric machine.

6. The driving device according to claim 3, wherein the controller is configured to cause the second inverter unit to operate as a neutral point of the windings of the rotating electric machine while the third switching element is off.

7. The driving device according to claim 3, wherein the controller is configured to, while the third switching element is on, switch on and off each of the switching elements in the first inverter unit by PWM control and switch on and off each of the switching elements in the second inverter unit at the electric fundamental frequency of the motor generator.

8. The driving device according to claim 6, wherein
the controller is configured to, while the third switching element is on, switch on and off each of the switching elements in the first inverter unit by PWM control and switch on and off each of the switching elements in the second inverter unit at an electric fundamental frequency of the motor generator.

9. The driving device according to claim 3, wherein
the third switching element has a lower ON resistance than the first switching elements.

10. The driving device according to claim 6, wherein
the third switching element has a lower ON resistance than the first switching elements.

11. The driving device according to claim 7, wherein
the third switching element has a lower ON resistance than the first switching elements.

12. The driving device according to claim 8, wherein
the third switching element has a lower ON resistance than the first switching elements.

13. The driving device according to claim 4, wherein
the controller is configured to, in response to a modulation rate calculated from a fundamental component amplitude of a phase winding voltage of the rotating electric machine and a DC voltage of the first power source unit being less than a predetermined value, cause the second inverter unit to operate as a neutral point of the windings of the rotating electric machine.

14. The driving device according to claim 4, wherein
the controller is configured to, in response to a modulation rate calculated from the fundamental component amplitude of a phase winding voltage of the rotating electric machine and the DC voltage of the first power source unit being equal to or greater than a predetermined value, switch on and off each of the switching elements in the first inverter unit by PWM control and switch on and off each of the switching elements in the second inverter unit at the electric fundamental frequency of the motor generator.

15. The driving device according to claim 13, wherein
the controller is configured to, in response to the modulation rate being equal to or greater than the predetermined value, switch on and off each of the switching elements in the first inverter unit by PWM control and switch on and off each of the switching elements in the second inverter unit at the electric fundamental frequency of the motor generator.

16. The driving device according to claim 5, wherein
the controller is configured to generate pulse-width modulation (PWM) signals to be supplied to the plurality of first switching elements for switching on and off each of the first switching elements by PWM control, based on either
a comparison between a carrier wave and a modulation wave reversed in polarity each half cycle of the electric fundamental frequency of the rotating electric machine
or
a comparison between a modulation wave and a carrier wave reversed in polarity each half cycle of the electric fundamental frequency of the rotating electric machine.

17. The driving device according to claim 7, wherein
the controller is configured to generate pulse-width modulation (PWM) signals to be supplied to the plurality of first switching elements for switching on and off each of the first switching elements by PWM control, based on either
a comparison between a carrier wave and a modulation wave reversed in polarity each half cycle of the electric fundamental frequency of the rotating electric machine
or
a comparison between a modulation wave and a carrier wave reversed in polarity each half cycle of the electric fundamental frequency of the rotating electric machine.

18. The driving device according to claim 8, wherein
the controller is configured to generate pulse-width modulation (PWM) signals to be supplied to the plurality of first switching elements for switching on and off each of the first switching elements by PWM control, based on either
a comparison between a carrier wave and a modulation wave reversed in polarity each half cycle of the electric fundamental frequency of the rotating electric machine
or
a comparison between a modulation wave and a carrier wave reversed in polarity each half cycle of the electric fundamental frequency of the rotating electric machine.

19. The driving device according to claim 14, wherein
the controller is configured to generate pulse-width modulation (PWM) signals to be supplied to the plurality of first switching elements for switching on and off each of the first switching elements by PWM control, based on either
a comparison between a carrier wave and a modulation wave reversed in polarity each half cycle of the electric fundamental frequency of the rotating electric machine or
a comparison between a modulation wave and a carrier wave reversed in polarity each half cycle of the electric fundamental frequency of the rotating electric machine.

20. The driving device according to claim 15, wherein
the controller is configured to generate pulse-width modulation (PWM) signals to be supplied to the plurality of first switching elements for switching on and off each of the first switching elements by PWM control, based on either
a comparison between a carrier wave and a modulation wave reversed in polarity each half cycle of the electric fundamental frequency of the rotating electric machine or
a comparison between a modulation wave and a carrier wave reversed in polarity each half cycle of the electric fundamental frequency of the rotating electric machine.

* * * * *